United States Patent [19]
Hinkey et al.

[11] Patent Number: 5,864,517
[45] Date of Patent: Jan. 26, 1999

[54] PULSED COMBUSTION ACOUSTIC WAVE GENERATOR

[75] Inventors: John B. Hinkey; Joseph T. Williams, both of Seattle; Thomas R.A. Bussing, Issaquah, all of Wash.

[73] Assignee: Adroit Systems, Inc., Bellevue, Wash.

[21] Appl. No.: 820,882

[22] Filed: Mar. 21, 1997

[51] Int. Cl.$^6$ ..................................................... G01V 1/00
[52] U.S. Cl. ........................ 367/145; 181/116; 181/117; 116/23; 116/137 R; 116/137 A
[58] Field of Search .............. 367/145; 181/116, 181/117, 118; 116/23, 137 R, 137 A

[56] References Cited

U.S. PATENT DOCUMENTS

| | | | |
|---|---|---|---|
| 2,766,837 | 10/1956 | McCollum | 367/145 |
| 2,831,666 | 4/1958 | Compton | 367/145 |
| 3,048,816 | 8/1962 | Lubnow | 367/145 |
| 3,064,619 | 11/1962 | Fortman | 367/145 |
| 3,064,753 | 11/1962 | McClure | 367/145 |
| 4,189,026 | 2/1980 | Elliot et al. | 181/118 |
| 4,642,611 | 2/1987 | Koemer | 340/385 |
| 4,896,502 | 1/1990 | Ravel et al. | 60/270.1 |
| 5,345,758 | 9/1994 | Bussing | 60/39.38 |
| 5,353,588 | 10/1994 | Bussing | 60/39.38 |

OTHER PUBLICATIONS

Sutton, G.P., "Rocket Propulsion Elements: An Introduction to the Engineering of Rockets," Wiley–Interscience Publications, New York, New York, 1992.

Mattingly, J.D., Heiser, W.H., and Daley, D.H., "Aircraft Engine Design," AIAA Education Series, AIAA, Washington, DC, 1987.

Oates, G.C., Editor, "Aircraft Propulsion Systems Technology and Design," AIAA Education Series, AIAA, Washington, DC, 1989.

Johnson, W., "Analytical and Experimental Study of the Pulsejet Ejector," Ph.D. Dissertation, Department of Mechanical Engineering, University of Clemson, 1967.

Heiser, W.H. "Thrust Augmentation." Paper No. 66–GT–116, American Society of Mechanical Engineers. 1966.

Lockwood, R.M. "Interim Summary Report on Investigation of the Process of Energy Transfer from an Intermittent Jet to a Secondary Fluid in an Ejector–type Thrust Augmentor." Hiller Aircraft Corp. Report No. ARD–286, Mar. 31, 1961.

Lockwood, R.M. "Interim Summary Report on Investigation of the Process of Energy Transfer from an Intermittent Jet to a Secondary Fluid in an Ejector–type Thrust Augmentor." Hiller Aircraft Corp. Report No. ARD–305, Jun. 30, 1962.

Clark, L.T., "Aplication of Compound Flow Analysis to Supersonic Ejector–Mixer Performance Prediction," AIAA Paper 95–0645, 1995.

Bernstein, A., Heiser, W., and Hevenor, C., "Compound–Compressible Nozzle Flow," AIAA Paper 66–663, 1966.

FOA, J.V., "Intermittant Jets", vol. XII High Speed Aerodynamics and Jet Propulsion, 1959.

O'Brien, J.G. "The Pulse Jet Engine A Review of Its Development Potential", Naval Postgraduate School, Jun. 1974.

*Primary Examiner*—J. Woodrow Eldred
*Attorney, Agent, or Firm*—Christensen O'Connor Johnson & Kindness PLLC

[57] ABSTRACT

A pulsed combustion acoustic wave generator includes a tubular barrel having an inlet end and an open outlet end, a fuel controller for metering a controlled quantity of fuel into the inlet end of the barrel, an oxidant controller for metering a controlled quantity of oxidant into the inlet end of the barrel and an igniter extending into the inlet end of the barrel that is controllable by an operator to ignite a mixture of fuel and oxidant in the inlet end.

19 Claims, 7 Drawing Sheets

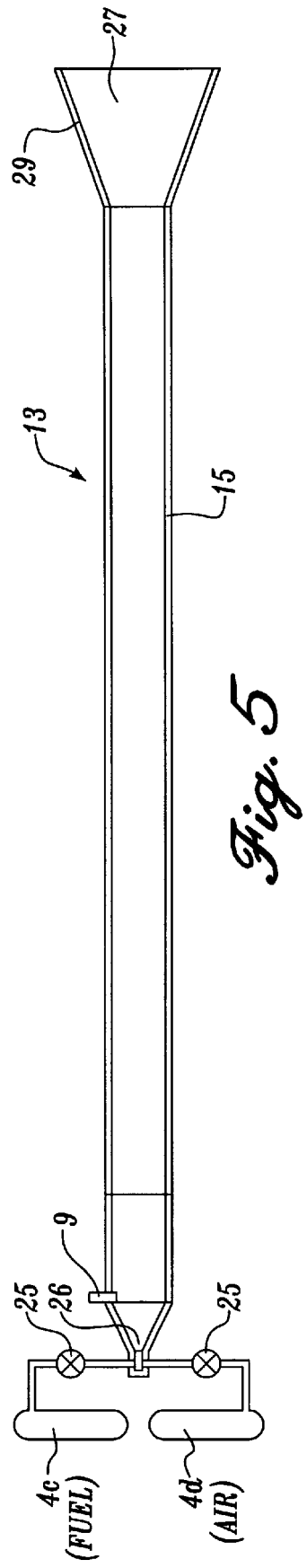

PULSED COMBUSTION ACOUSTIC WAVE GENERATOR

FIELD OF THE INVENTION

The subject invention pertains to a compact device designed to generate repetitive high amplitude acoustic pulses or pressure waves which may be utilized in a variety of applications.

BACKGROUND OF THE INVENTION

A device to produce high amplitude impulsive pressure waves may be based on several different schemes. Electrical energy may be utilized to produce sound waves through loudspeakers or piezoelectric devices, but high power requirements may result in energy storage difficulties as well as problems with the large physical dimensions necessary to produce high acoustic intensities (low power densities). Mechanical devices may be used to produce repetitive loud sounds, but would be inefficient and unwieldy. Methods which convert chemical energy to acoustical energy are ideal because of the high power densities which may be achieved. Solid explosives have very high energy densities and are capable of producing extremely high peak pressure levels (i.e., blast waves from bombs), but are dangerous to work with and are not practical to use if a repetitive impulse is required. Gaseous and liquid chemicals can be easily stored, are typically quite safe when fuels and oxidizers are separately stored, and can be mixed and combusted in a very rapid manner. Although not as high in energy density as solid explosives, gaseous or liquid combustible mixtures provide reasonable energy densities which may be quickly converted to pressure or acoustical energy. Repetitive release of stored chemical energy (via an energetic chemical reaction) to produce high amplitude pressure/acoustic waves can be achieved through pulsed combustion technology. Pulse combustion includes two different modes of burning: detonation and deflagration. Detonative combustion is characterized by an extremely fast flame speed (2,000 to 4,000 m/s) and very high amplitude pressure waves, while deflagrative combustion typically exhibits a much slower flame speed (generally less than about 200 m/s) and significantly lower amplitude pressure waves.

Repetitive, high amplitude pressure or acoustic waves can be utilized as a non-lethal effects device. The detrimental effects on humans of continuous exposure to high levels of "noise" (broad band and discrete frequency) are well studied and have been known for many years. These detrimental effects are usually long term in nature and consist of symptoms such as permanent hearing loss, general fatigue, elevated stress levels, and other physiological effects. The sound pressure and corresponding sound pressure levels (SPLs) of continuous exposure with which the average person is familiar are shown in Table 1.

TABLE 1

Examples of typical sound pressure levels (SPLs) and sound pressures for common environments.

| Sound Pressure Pa(N/m$^2$) | Sound Pressure Level dB (2 × 10$^{-5}$ Pa ref.) | Typical Environment |
| --- | --- | --- |
| 0.000020 | 0 | Threshold of Hearing |
| 0.000063 | 10 | Rustle of Leaves |
| 0.00020 | 20 | Broadcast Studio |
| 0.00063 | 30 | Bedroom at Night |

TABLE 1-continued

Examples of typical sound pressure levels (SPLs) and sound pressures for common environments.

| Sound Pressure Pa(N/m$^2$) | Sound Pressure Level dB (2 × 10$^{-5}$ Pa ref.) | Typical Environment |
| --- | --- | --- |
| 0.0020 | 40 | Library |
| 0.0063 | 50 | Quiet Office |
| 0.02 | 60 | Conversational Speech |
| 0.063 | 70 | Average Radio |
| 0.1 | 74 | Light Traffic Noise |
| 0.2 | 80 | Typical Factory |
| 0.63 | 90 | Subway Train |
| 2.0 | 100 | Symphony Orchestra |
| 6.3 | 110 | Rock Band |
| 20. | 120 | Aircraft Takeoff |
| 200 | 140 | Threshold of pain |

Sensations of feeling or tickle commence at approximately 130 dB (0.009 psi rms) while significant discomfort occurs at approximately 120 dB (0.003 psi rms). Thus a pressure rise as small as 0.003 psi may cause considerable discomfort.

Non-continuous tone (impulsive noises) may have different effects on an individual, especially if the impulses are unexpected. An impulsive noise is one which has a high peak pressure acting over a short duration. The form of the impulses can be high amplitude sound waves suddenly switched on which then rapidly decay in amplitude or discrete pressure pulses which may contain many frequencies.

The physiological effects of low amplitude impulsive noise consists mainly of the startle response if the peak amplitude is not excessive. At higher peak amplitudes, in addition to the startle response, temporary threshold shift (TTS) occurs. TTS is the temporary increase in the threshold of hearing (the minimum sound level which evokes an auditory response) as a result of exposure to noise. TTS generally occurs at a minimum sound pressure level of 140 dB for gunfire and 130 dB for impact noise in an enclosed space (TTS is reported to increase when exposure occurs in an enclosed space). In general the amount of TTS increases with peak sound pressure level, but as the duration of the impulse decreases below 5 milliseconds, the effect is lessened for a given peak amplitude. In addition, the amount of TTS increases approximately linearly with exposure time, resulting in an increase in TTS with the total number of repetitive pulses one is exposed to (not the total exposure time). Upon cessation of exposure to repetitive impulsive noise. the threshold shift immediately begins a rapid recovery and reaches a minimum after approximately 1 minute, but then rebounds to a maximum at approximately 2 min. This is known as the bounce effect and may be useful in attempts at incapacitation/impairment using repetitive impulsive noise.

The threshold of pain normally associated with continuous exposure (non-impulsive noise) cannot be used to predict the risk of damage due to non-continuous sounds (impulsive noise). In fact intermittent noise has been observed to be less hazardous than steady-state noise for an equivalent amount of sound energy delivered to the ear.

Eye and hand coordination are particularly affected by impulsive noise, with significant impairment lasting from a typical 2 to 3 seconds to as much as 30 seconds in some individuals.

At still higher peak pressures, the physiological effects are centered mainly on damage to the structures of the ear. Peak impulse pressures of a few pounds per square inch can rupture the eardrum with smaller pressures capable of permanently damaging the conducting mechanisms of the inner ear. The ear's greatest mechanical sensitivity lies in the 1,500 to 3,000 Hz range, and thus is particularly vulnerable to short-duration blast waves which may contain many such frequencies at significant amplitudes.

Additional non-lethal effects of high level impulsive pressure waves include the potential ability to physically move or knock down an individual at close range due to the over-pressure associated with an impulse of sufficient strength. Non-auditory damage occurs at impulse peak pressures of approximately 1 atm (14.7 psi) with little physical damage occurring for peak pressures less than 1 atm which last for very short periods of time (milliseconds).

Infrasound (sound frequencies below approximately 16 Hz) may also have a non-lethal effect on the human body. Pulse jets may cause nausea and difficulty breathing due to the large amplitude impulsive waves generated by the devices, which pulse at up to 45 times per second.

SUMMARY OF THE INVENTION

A pulsed combustion acoustic wave generator which includes a tubular barrel having an inlet end and an open outlet end, a fuel controller for metering a controlled quantity of fuel into the inlet end of the barrel, an oxidant controller for metering a controlled quantity of oxidant into the inlet end of the barrel and an igniter extending into the inlet end of the barrel that is controllable by an operator to ignite a mixture of fuel and oxidant in the inlet end.

The pulsed combustion acoustic wave generator of the present invention is based on pulse detonation and pulse jet technology which enables the production of strong acoustic impulses. These impulses are adjustable in peak pressure levels and repetition rates to suit different applications regarding the non-lethal incapacitation, impairment, or immobilization of individuals and material targets, crowd control and dispersal, and self defense capability. The present invention can be adjusted in size and operation to provide different levels of acoustic power which can quickly be changed. In addition, the acoustic energy may be directed to some degree, thereby enhancing effectiveness.

The general configuration of the invention consists of a combustion tube of a predetermined length and diameter. One end of the combustor tube is open to allow the blast/shock wave produced by the combustion to propagate into the atmosphere. A nozzle or device capable of directing the acoustic energy may be attached to the end of the combustion tube. At the closed end, a fuel injection and ignition system meters and ignites the fuel/oxidizer mixture. Variation of the amount of fuel/oxidizer injected into the combustion tube allows adjustment of the impulse peak pressure. The rate at which the fuel/oxidizer is ignited by the ignition system determines the repetition rate.

In the pulsed acoustic wave generators of the invention, a detonation wave is initiated at the closed end of the tube to start the cycle. The wave propagates at a high velocity (2,000 to 4,000 m/s) through the fuel/oxidizer mixture, producing very high pressures due to the rapid combustion. When the detonation wave reaches the open end of the tube, it produces a blast wave of high amplitude. The process of filling the tube with a detonable fuel/oxidizer mixture and then producing a detonation can be repeated in a rapid manner (i.e., "pulsed") to produce a series of acoustic pressure waves. The frequency of the impulses is controlled by the frequency of injection of the fuel/oxidizer mixture. Ignition is typically initiated by a spark device.

In another mode, the invention utilizes pulse jets which operate by deflagrative combustion in which the combustion wave travels at a much slower speed (typically 10 to 100 m/s), thereby producing a much smaller pressure rise compared to pulse detonation. In this mode, the invention includes a tube with a set of reed valves (one-way valves) at one end, while being open at the other end. Operation is achieved by partially filling the tube with a combustible fuel/air mixture near the valved end, with the balance of the tube containing air drawn in from the open end. The combustion of the fuel/air mixture produces a moderate pressure wave which propels the combustion products and remaining air in the tube out of the open end. The pressure in the tube drops slightly below ambient due to over expansion of the flow which then allows air to be drawn in through the one-way valves at the closed end and through the open end. Fuel is injected into the fresh air in the tube and the cycle is repeated. The repetition rate is controlled by the frequency of fuel injection and ignition can be self sustaining once initiated with a spark device.

Situations where a single large amplitude pressure wave or a series of such waves may be useful depend on the intended effect. For general crowd control, a repeated series of moderate, amplitude (110 to 130 dB peak level) impulsive sounds from the present invention with a significant low frequency content may be quite effective and non-lethal; especially at close ranges where other methods, such as rubber bullets or water cannons can be quite dangerous. In addition, the potential large low frequency content of an impulsive wave may be difficult to attenuate effectively with typical ear protection devices. Typically maximum attenuation of 20 to 25 dB of high frequency noise can be attained with concurrent use of good quality ear plugs and earmuffs and thus may still be ineffective at higher sound levels, i.e., 140 to 150 dB and lower frequencies.

For incapacitation or immobilization of an individual or closely spaced group of individuals, the present invention discharged at close range may be enough to momentarily confuse, distract, deafen (temporary threshold shift), or startle (temporary loss of eye and hand coordination) the individual or group, resulting in reduced resistance to capture. The incapacitating effects of high amplitude impulsive noise are enhanced if the device is discharged in an enclosed space due to the reflections of energy from walls and internal objects. This may make the present invention suitable to military and law enforcement officials who wish to utilize the device for surprise raids on large numbers of people in enclosed spaces (i.e., homes used for drug trafficking and manufacture, etc.).

As an aid to immobilizing vehicles at close range, the present invention may be used to shatter windshields and vehicle side windows using the potentially high pressure resulting from a reflected high amplitude impulsive wave. No high-speed projectiles would be utilized, thereby reducing the possibility of accidental death due to high-speed projectile wounds (gunshot wounds). The occupants may also be incapacitated to some degree. In general, the present invention may be suited to rapid destruction of windows, doors, and other similar structures which need to be opened quickly without causing serious injury to occupants due to projectiles.

An advantage that the subject invention has over other techniques such as concussion grenades is the directive nature of the impulse, which may enhance the effects of the blast while reducing the effect on the operator. In addition, rapid, multiple pressure impulses may be utilized, if necessary; a characteristic not found in concussion grenades and other solid explosive-based devices. The amplitude of the impulse generated by the present invention would also be repeatable due to the ability to meter the amount of combustible gas injected into the combustion tube.

The characteristic size of the device of the subject invention may be selected for the intended purpose. Larger, more powerful devices applicable for crowd control situations could be mounted on a vehicle or structure. More mobile devices of less power could be man-portable to allow for more flexible use. Small devices for personal protection designed for discharges at very close range may even be made semi-concealed.

If necessary the present invention could, with appropriate design, be made to transition to a lethal mode by introducing projectile(s) into the combustion tube just prior to igniting the combustible mixture. The resulting high velocity of the combustion products upon expansion from the open end of the combustor tube would effectively propel a projectile(s) to a significant velocity.

The subject invention could be used to startle, intimidate, and disperse a crowd of people. It could be hand carried or mounted on a building, barricade, or vehicle. Acoustic emissions could be scaled over a large range. As a result, the device could be used at a low setting to gain the attention of an unruly group, at a moderate setting to startle and disorient a crowd, or at fall power to clear an area by making the noise level intolerable. Alternately, the present invention could be designed to operate at a single setting, substantially decreasing the possibility of mistaken use of excessive power.

The subject invention would be ideal for defense of a fixed position or barricade against a crowd armed only with typical riot weapons (stones, sticks, etc.) Without injuring people, the device would startle them with the abruptness and force of noise, stunning and disorienting them, and forcing their attention away from their objective and toward personal preservation.

Due to the acoustic nature of the device, using it in an enclosed space would heighten the disorientation and stun effects on individuals. The open end could be inserted into a room through a window or partly open door without exposing the operators to the occupants of the room. After a quick single or multiple pulse burst from the device, the room could be stormed while the occupants are recovering from the effects. This type of situation is also applicable to law-enforcement actions.

The present invention can be employed as a booby-trap, where a proximity sensor or other type of trigger begins operation without the direct control of an operator. The highly directional acoustic emissions would deliver full force effects on the target without undesirable effects on appropriately placed friendly troops. In this way, the subject invention would be similar to a non-lethal Claymore mine.

Current methods for dealing with vehicles or people trying to get past a checkpoint include using a barricade or shooting them. The subject invention gives flexibility to the level of response in such a situation. A device buried beneath the checkpoint or mounted to the checkpoint structure would have the ability to seriously impair the vehicle driver's ability to function. A large buried unit could generate sufficient force to damage or overturn a moving vehicle, while an above-ground unit could break vehicle windows. The vehicle driver would be exposed to the full stunning and disorienting effects of the device, as well as having the windows blow in. Since the device could be reset very quickly (multiple, rapid discharges), it could deal with repeated attempts at passage by multiple vehicles or people.

Current mine detonation methods involve the use of high explosives, which must be stored, carried into position, and exploded properly. However, it is not always clear that the mine has been detonated; the high explosives can mask the mine's explosion. The present invention could reduce that risk and decrease uncertainty associated with this operation. The pressure waves produced by the subject invention may be sufficient to trigger pressure-fused mines. Some mines are designed to do the most damage by going off only after repeated triggering. The subject invention could be cycled several times a second to ensure that these types of mines would be triggered. A mine-clearing device could be deployed on a boom from an armored vehicle, on a remotely controlled self-propelled platform, or suspended below a helicopter. Other airborne or ground-based installations are possible.

In addition to use as a mine disposal device, the subject invention has the potential to be used as a non-lethal mine. A buried device would, upon being triggered, fire its blast upwards at the target. While a very large device could inflict mortal injury in this manner, a small one almost certainly would not. It would stun and disorient the target, as well as giving loud notice to all concerned that the mine had been triggered. The present invention could also be designed to create a fuel-oxidizer cloud above ground before detonating, resulting in a much larger, omni-directional blast (similar to a fuel-air explosive). This type of free explosion could affect targets some distance away.

The subject invention produces high amplitude pressure waves which propagate through the air in an expanding shock wave. Depending on the size of the device and the distance involved, these pressure waves could be used to exert pressure force at a distance to, for example, break windows, knock down doors, and other types of use where a non-projectile force needs to be delivered without seriously harming the occupants. Multiple units could be synchronized to produce constructively interfering pressure waves, resulting in traveling force loci or nodes with higher pressures than could be achieved with a single device.

Recent use of loud music for psychological warfare in Panama and Waco, Tex., demonstrates the potential of using acoustics for disrupting sleep, disturbing thought patterns, and causing disorientation. The present invention would be ideal for this role, as its acoustic power and speed of pulsing could be varied drastically depending on need, it could run in repeating mode indefinitely as long as fuel is available, and its impulsive noise is very difficult to shut out. A device could be set to steadily increase noise levels with a random time between pulses until the target of its emissions surrenders or leaves. Steady-state high frequency noise could be reduced and canceled through electronic means, but high amplitude low frequency transient noise cannot be effectively attenuated in this manner. In addition, sound suppressers (i.e. headphones, earplugs) are probably not capable of reducing the noise level enough to render it ineffective.

The subject invention could be designed to propagate its pulsed acoustic emissions into water where the wave will travel very quickly for long distances. The ability to generate, repetitive high amplitude underwater acoustic pulses at any rate desired could be useful for decoys or to drown out noises which could otherwise be detected and identified, such as submarines or surface ships. Another important application in this area is that of civilian or military rescues where a device could produce discrete, high amplitude underwater acoustic waves which could be detected at large distances, thereby aiding in location in maritime emergencies.

The present invention may be capable of setting off contact and pressure triggered underwater mines in the same manner as land mines. High amplitude sound waves, like those created by this invention, propagate very well under water. As the waves strike the mine surface and reflect, sharp impulses would be delivered to the triggering mechanism. As with land mines, the present invention may trigger the mine without the use of conventional explosives which could mask the explosion and are dangerous to carry and place near the mine.

In mountain passes, recoilless howitzers and explosive charges placed on the slopes are used to trigger avalanches in a controlled manner. The sound pressure delivered by this invention may be enough to trigger avalanches without having to resort to expensive and dangerous solid explosives. By varying the frequency of pulses across a wide range, the device could create a harmonic vibration in the snow pack, increasing the likelihood of forcing the snow pack to avalanche.

This invention can function as an acoustic cleaner in power generation facilities. Deposits on the interior heat-transfer and structural surfaces can decrease the efficiency of a heat exchanger and increase the rate of corrosion. By producing low frequency, high amplitude acoustic waves, the subject invention would cause particulate and slag deposits to resonate and dislodge from the surface without having to resort to expensive steam cleaning.

The subject invention could be used in much the same manner for animal control purposes as it could for crowd control. A fixed or mobile unit could be used to scare wildlife or birds away from an airport runway and units suspended from helicopters could be used to herd wild animals without resorting to gunfire.

By introducing sound waves into the ground and recording their reflections, scientists can determine the composition of the earth's sublayers, without drilling for samples. Explosives and large "thumper" trucks are currently used to generate sound waves, but the invention could generate precise sound waves at exact intervals to increase the amount of information that could be gained from these studies. Such a device may be significantly less expensive than a "thumper," and is easier and safer to work with than conventional explosives.

The invention's ability to generate precise high amplitude pressure waves in air could be utilized to create these waves in any gas, liquid, or solid material at exact intervals and at significant amplitudes. This ability translates to an inexpensive and precise acoustic emitter for use in acoustic research such as mechanical and electronic noise attenuation and shock wave propagation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1b is a graph illustrating pressure level variance with time during the combustion cycle of FIG. 1a;

FIG. 4 is a schematic view showing a fuel/oxygen embodiment of the pulsed combustion acoustic wave generator of the present invention;

FIG. 5 is a schematic view showing a fuel/air embodiment of the pulsed combustion acoustic wave generator of the present invention;

DETAILED DESCRIPTION OF THE PREFERRED EMBODIMENT

Figure 1A:
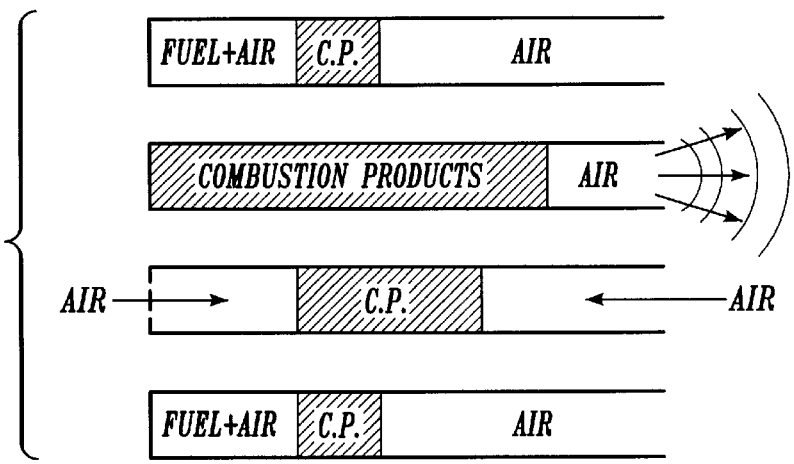
FIG. 1a is a schematic illustration of a typical deflagrative combustion cycle in a tube.
Figure 1B:
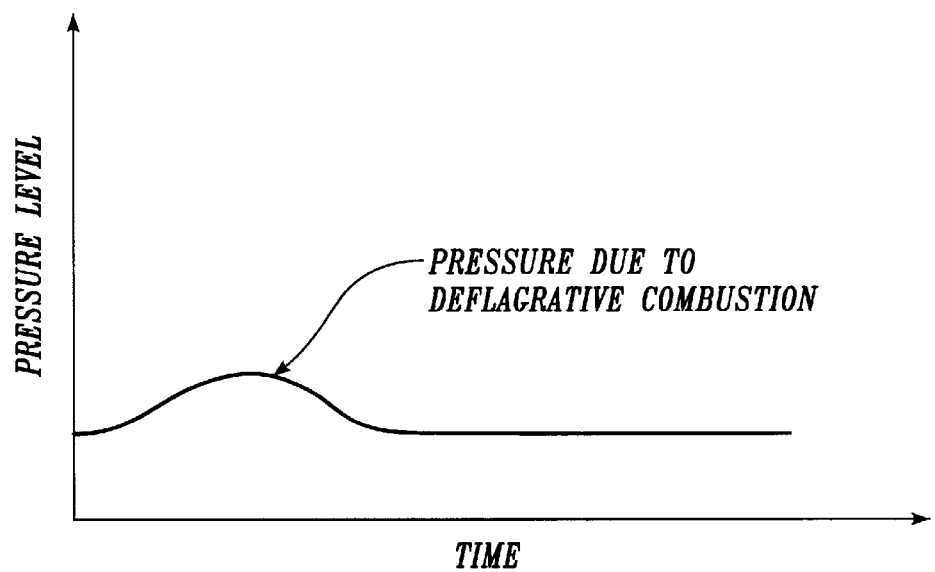

FIGS. 1a and 1b show typical deflagrative combustion cycles and detonative combustion cycles, respectively, and the attendant pressure characteristics which the present invention is capable of producing.

Figure 1C:
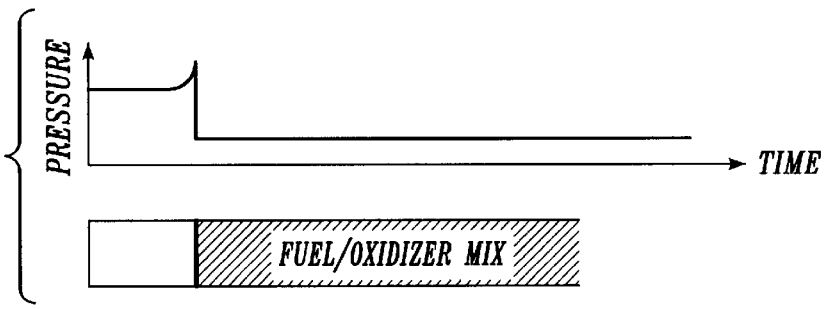
FIGS. 1c–1e are successive schematic illustrations of a detonative combustion cycle in a tube, each with a graph showing pressure change with time for the portion of the combustion cycle illustrated.
Figure 1D:
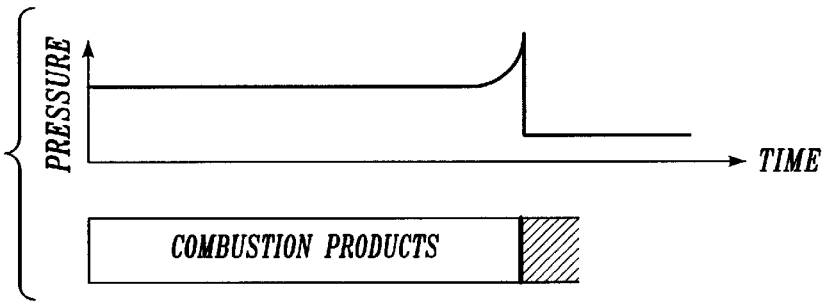
Figure 1E:
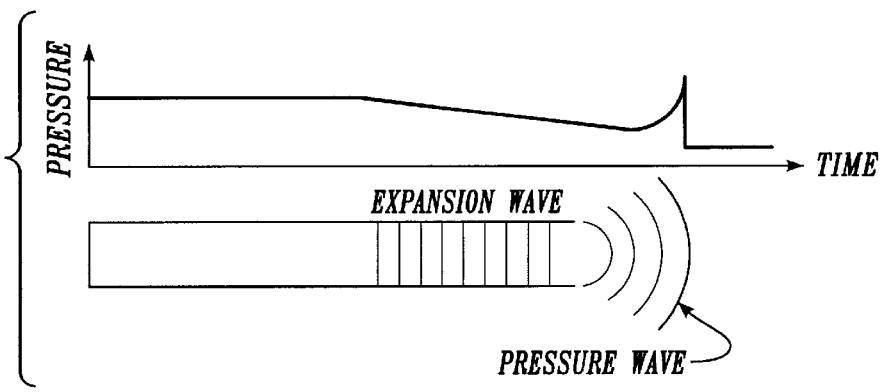
Figure 1F:
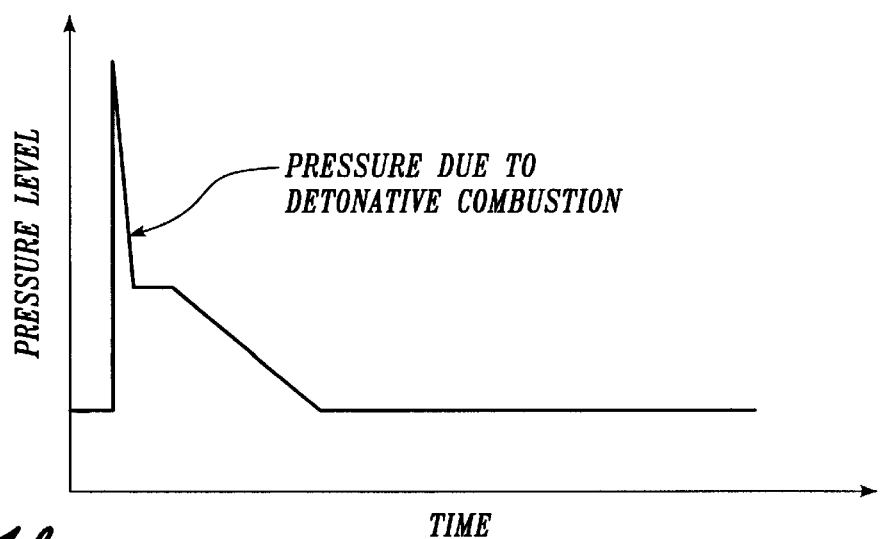
FIG. 1f is a graph of pressure level versus time illustrating the change in pressure during the detonative combustion cycle illustrated in FIGS. 1c–1e.

FIG. 1c shows one possible embodiment of a close-range hand-held pulsed combustion acoustic wave generator 1 with limited firing duration. The configuration shown is similar to an oversize flare gun, and would be sized for use in special operations, security, and personal defense applications. In FIG. 1, gaseous, liquid or solid fuel and gaseous or solid oxygen storage is in fuel/oxidizer container 4 beneath the barrel 3, alongside power system 5 (e.g., a battery). Control system 7 and the spark system 9 are contained behind the barrel 3 above the grip 11. Use of advanced, lightweight materials such as, for example, synthetic polymers, would minimize the weight, thereby allowing a high degree of portability. The pulsed combustion acoustic wave generator 1 of FIG. 1c is capable of repetitive firing about, for example, 25 rounds without refill, and is about 10 inches in barrel 3 with an inside diameter of barrel 3 being about 1 inch.

Figure 2A:
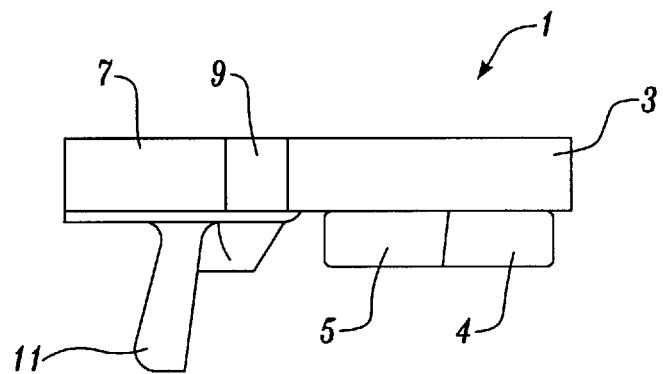
FIG. 2a is a schematic diagram of a pulse combustion acoustic wave generator in accordance with the present invention, intended for use by a single person.
Figure 2B:
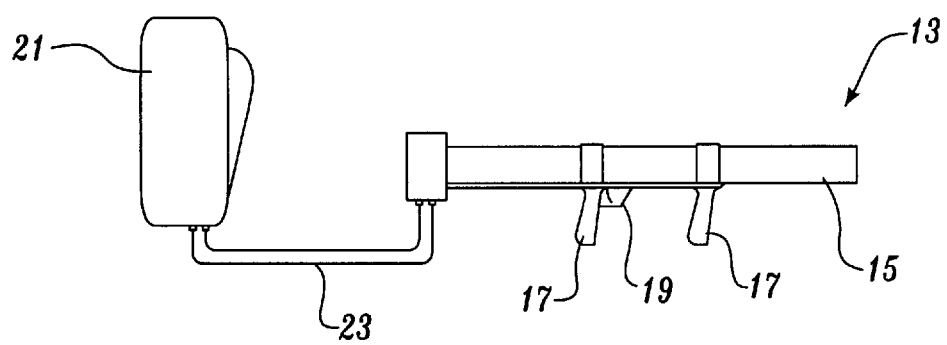
FIG. 2b is a schematic diagram of a pulse combustion acoustic wave generator of the present invention, intended for use by multiple persons.

FIG. 2 shows one possible embodiment of a man-portable pulsed combination acoustic wave generator 13 having short- to medium-range and capable of about, for example, 100 shots without refill. The combustor tube 15 is equipped with grips 17 and a firing trigger 19, while the spark, control, fuel/oxidizer and power systems are contained in the backpack 21. Fuel and electrical cables 23 connect the combustor tube 15 to the backpack 21. Combined weight of the combustor tube 15, and backpack 21 is estimated to be at or below 40 lbs.

Referring again to FIG. 2, larger sizes of pulsed combustion acoustic wave generators 13 are also contemplated which are effective at longer ranges than the smaller units. Thus, a pulsed acoustic generator 13 having a combustor tube 15 of about 48 inches in length, and an inside diameter of about 4 inches, for example, and having about 300 shots could be used for defense of a fixed position or be mounted to a light vehicle for mobile use. This embodiment is large enough to be used against windows and doors, and is likely to require a two person crew to transport. One person would carry the combustor tube 15 and any supports (bipod) while the other would carry the spark, control, fuel/oxidizer, and power systems in backpack 21. This embodiment could also be mounted on a Jeep or light truck for fast deployment. An advantage of the mounted configuration is that the pulsed acoustic wave generator 13 could utilize the vehicle's electrical system and fuel supply, reducing the cost and complexity of the system.

Again, referring to FIG. 2, an even larger embodiment of pulsed acoustic wave generator 13 is contemplated having a combustor tube 15 length of about 96 inches, an inside diameter of about 12 inches and having about 100 shots is contemplated. This embodiment could be used to defend a checkpoint or embassy against vehicles and personnel. A possible checkpoint configuration is a subterranean installation directed up at a vehicle. Alternately, the pulsed acoustic wave generator 13 could be mounted parallel to the ground to direct the effects at the vehicle driver. At the large end of the combustor size scale, this embodiment would be capable of projecting impulsive pressure waves much farther than the smaller scale devices. It also would require substantially more fuel and oxidizer than the smaller examples. This embodiment could be mounted on an outpost building and used to prevent approach of hostile personnel, or deployed on an armored vehicle and used to clear a wide path through opposing forces. While not fatal to human targets, this embodiment should cause significant discomfort and disorientation to anyone trying to approach or failing to get out of the way of its passage. As the operating device came nearer, the target would learn that closer proximity would only result in an increase in discomfort and possible permanent damage.

Although the pulse acoustic wave generators 1 and 13 above are all assumed to have combustor tubes 3 or 15 that are circular, there are many other possible cross-section designs which could be utilized. Non-circular cross section combustor tubes have attractive characteristics from a packaging standpoint, and there is much latitude available in designing these shapes. In addition, while a single combustor tube is shown two, three, or more tubes are a simple extension of the design. Multiple tubes have important effects on impulsive waveform and amplitude. For example, multiple tubes can fire simultaneously to increase the peak sound pressure level, fire out of phase to increase the effective cycle rate, or ripple-fire to increase the effective duration of the waveform. The use of multiple tubes gives additional flexibility to operation.

Figure 3:
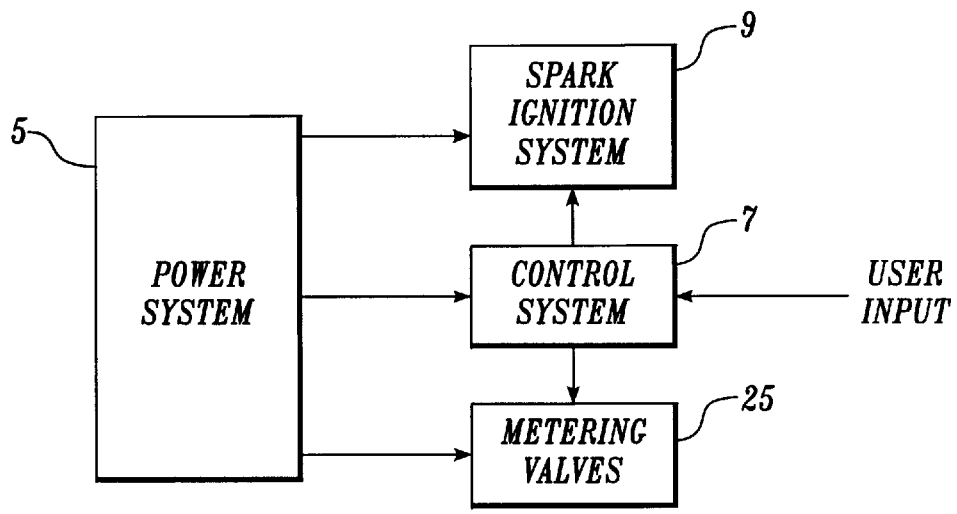
FIG. 3 is a block diagram showing the interconnection between the power system, spark ignition system, control system and fuel/oxidizer metering valves of the pulsed combustion acoustic wave generator of the present invention.

Next, the control system 7 of FIGS. 1 and 2, as shown in further detail in FIG. 3, is described. The control system 7 consists of a dedicated microprocessor, which samples the control inputs (desired sound intensity and shot duration, for example), accesses the pre-programmed memory to determine the optimum operating characteristics for the given settings, then manipulates relays or transistors to operate the fuel/oxidizer metering valves and spark ignition system, both described in further detail below. It is estimated that approximately 5 watts of power are required for operation of the control system.

Again, referring to FIG. 3, fuel/oxidizer metering valves 25 may be, for example, solenoid valves that utilize an electrical supply at between 12 and 50 volts DC. Each valve 25 draws a maximum of about 30 watts of electrical power when open. No more than two valves 25 will be in operation at any given time for a portable pulsed combustion acoustic wave generator 1 or 13. Larger embodiments may use more valves 25, but will likely have access to a fixed power supply. In total, the fuel/oxidizer metering valves 25 are estimated to require about 60 watts of power during firing of the pulsed combustion acoustic wave generator 1 or 13.

The spark ignition system 9, of FIG. 3 supplies spark energy to initiate each detonation. For pulsed combustion acoustic wave generator 1 or 13 operating at 10 shots per second, and a typical spark system efficiency of 15%, the average power requirement for the spark system is approximately 107 watts. As with the fuel/oxidizer metering valves 25, this power is only required during actual firing while a spark ignition system 9 is shown. It is understood that other types of ignition systems such as laser, chemical, or plasma ignition systems, for example, can be employed.

Table 2 summarizes the power requirements under nine different conditions of pulsed combustion acoustic wave generator 1 or 13: "Off," "Standby," and "Firing." "Off" implies that the system is powered down for storage or carriage. When switched to "Standby," control system 7 would be initialized, which would check overall device readiness. In this mode, pulsed combustion acoustic wave generator 1 or 13 can be fired simply by pulling trigger 19. The pulsed combustion acoustic wave generator 1 or 13 operator would switch to "Standby" when preparing to fire. The "firing" mode is when pulsed combustion acoustic wave generator 1 or 13 is in the process of generating impulsive pressure waves (firing). This mode has the highest power consumption, but should have the shortest elapsed time of the three modes during a typical confrontation. For example, the operator may have the device in Standby mode for an hour during a riot, but may only fire for a few seconds of that time. It should be noted that the electrical power requirements during firing depend only on the cycle rate; variation of other combustion parameters have no impact.

TABLE 2

Total Estimated Power Requirements

| | Mode: | | |
|---|---|---|---|
| | Off | Standby | Firing |
| Control System | 0 Watts | 5 Watts | 5 Watts |
| Metering Valves | 0 Watts | 0 Watts | 60 Watts |
| Spark Ignition System | 0 Watts | 0 Watts | 107 Watts |
| Total | 0 Watts | 5 Watts | 172 Watts |

As stated above, 5 watts of power are required in Standby mode, and about 172 watts are required during firing. There are several ways to provide power system 5 of FIG. 3, depending on the type of installation. For a large, fixed installation, 110 VAC power should be available to meet all needs. Vehicle mounted systems will be able to utilize the vehicle 24 VDC electrical system, while portable systems can use small battery packs.

Thin metal film (TMF) batteries, currently commercially available, have a high discharge rate capability and rapid recharge characteristics. The two volt TMF battery is a 1.2 amp-hour battery (capable of sustaining 1.2 amps for one hour at 2 volts). By using TMF batteries, the necessary power can be provided without excessive weight and size. A battery pack consisting of six of these batteries, for instance, would weigh just over one pound, and take up less than ten cubic inches of volume. This battery pack is estimated to be capable of supplying the power requirements for two hours in "Standby" mode in addition to about two minutes firing. Longer operation can be obtained by increasing the size of the battery pack or by use of multiple packs. TMF batteries can be rapidly recharged if needed, and are capable of a complete recharge in five to ten minutes. Alternately, the battery pack can be designed to be quickly replaced when the batteries are completely discharged.

FIGS. 4 and 5 show fuel containers 4 as cylinders for storage of compressed gas for the fuels and oxidizers needed for pulsed combustion acoustic wave generator 1 or 13 operation. Quick-disconnect connections would enable the operator to change storage cylinders 4 quickly when the pressure drops too low. A handful of small cylinders for a hand-held or man-portable device could be easily carried in a backpack or on a utility belt.

From the standpoints of safety, long-term storage, and compactness, solid oxygen generators known in the art (commercially available and are used for emergency oxygen on commercial aircraft) are attractive. The generator grain would be surrounded with insulation, so even if the grain were ignited accidentally, the container would not be hot enough to cause burns. Also, if the generator were set off by a bullet, the oxygen being generated would simply vent without building up dangerous pressure levels. The spent cartridge could be saved for reloading or simply discarded. In the same vein, solid fuel generators known in the art (are currently being developed by various commercial entities) have very similar attractive features.

The solid oxygen generator could be packaged in a small insulated cartridge with enough grain for as many shots as desired. One feasible configuration would have a battery pack, oxygen supply, and fuel storage combined into a single package. The power and fuel supply can be proportioned so that battery, fuel, and oxygen need replacement at the same time. Ejecting the spent cartridge and inserting a new one would complete the re-fueling and re-powering process.

Still referring to FIGS. 4 and 5, FIG. 4 shows an embodiment of the present invention, wherein fuel and $O_2$ as the oxidizer are employed, while FIG. 5 shows an embodiment where fuel and air as the oxidizer are employed to provide energy for detonation. In operation of the embodiment of either FIG. 4 or FIG. 5, the pulsed combustion acoustic wave generator 1 is first readied for operation by the user initiating the "Standby" mode of control system 7 of FIG. 3 which configures power system 5, spark ignition system 9, and fuel/oxidizer metering valves 25 for operation. When the user initiates the "fire" mode of control system 7 by, for example, actuating trigger 19 of FIG. 2, control system 7 opens fuel/oxidizer metering valves 25 a predetermined amount to allow a predetermined amount of fuel and air or $O_2$ to flow from fuel, air, and oxygen containers 4a, 4b, 4c, and 4d into combustor tube 15. Control system 7 then actuates spark ignition system 9, located adjacent to inlet end 26 of combustor tube 15 to provide a spark within combustor tube 15, which initiates combustion and the propagation of a sound wave through combustor tube 15 and out of open outlet end 27 of combustor tube 15.

High amplitude pressure waves are produced as described above using detonative combustion when the combustion wave travels down combustor tube 15 faster than the speed of sound (supersonic). As a result, the combustion-generated pressure rise in combustor tube 15 does not have time to exhaust to the atmosphere before combustion is complete. The elevated pressure in combustor tube 15 does not begin to decrease until the detonation wave has passed out of the open outlet end 27 of combustor tube 15 and the high amplitude sound pressure wave has begun to travel away from pulsed combustion acoustic wave generator 1 or 13. Conversely, when combustion is achieved through the deflagrative mode with the subject invention, the flame front travels much more slowly (subsonically), and the pressure waves run ahead of the combustion front. These pressure waves reach the open end of combustor tube 15 and pressure in combustor tube 15 begins to decrease early in combustion. As a result, there is no opportunity to build up the high amplitude pressure wave characteristic of detonative combustion. Either detonative or deflagrative combustion can thus occur in combustor tube 15, depending on the amplitude of pressure wave desired. By preventing detonation from occurring, a much lower amplitude pressure wave is created, increasing the effective range of amplitudes which the pulsed combustion acoustic wave generator 1 or 13 is capable of producing. The control system 7 is capable of operating in either deflagrative or detonative mode, depending on the application.

Modification of the fuel to oxidizer ratio affects the waveform peak amplitude, combustion wave speed, and other aspects of the waveform. This parameter is most likely to be beneficial for 'tuning' the waveform to a desired shape and amplitude.

Reducing the amount of fuel and oxidizer has the following effect. In the combustible mixture, a detonation wave is initiated and travels down the combustor tubes 15 as usual. When the wave reaches the end of the combustible mixture, however, combustion no longer supports the pressure wave propagation, so the wave speed begins to decrease and the waveform starts to change as the wave propagates through the rest of the combustor tube 15. As the wave slows down, its amplitude decreases. Filling combustion tube 15 with progressively smaller and smaller amounts of fuel and oxidizer will progressively decrease the amplitude of the pressure wave at the open end 27. The result is a reduction in the level of non-lethal effects and/or a reduction in range for the same level of effects. For example, the operator may wish to gain the attention of a noisy crowd. Reducing the amount of fuel will reduce the noise level and 'sharpness' of the waveform so that the crowd is not subjected to the full power setting. An alternate scenario involves a target which is at closer range than appropriate for full power. Reduction in acoustic power can deliver the appropriate level of non-lethal effects without permanently harming the target. Modulating the amount of combustible mixture is performed by control system 7.

As previously mentioned, the effects of high amplitude impulsive noise may inversely scale with the time between pulses, rather than scaling with the total time of exposure to the noise. Pulsed combustion wave generator 1 or 13 creates an impulsive pressure wave each time combustor tube 15 is filled with combustible mixture and ignited. Control system 7 can be designed to control the rate at which this cycle is repeated. Example settings may range from one cycle per second to startle an opponent, to several tens of cycles per second to induce various less than lethal effects. A single or quick burst of low amplitude pulses is probably the most effective at gaining attention. A long continuous series of high amplitude pulses would be appropriate for disorientation and stun effects, or defense of a fixed position. In addition, the rate at which the pulses are generated may change the type or severity of the non-lethal effects.

Changing the geometry of nozzle or open end 27 can affect the tube exhausting process and should affect the propagation of the blast wave into the atmosphere. For example, FIGS. 4 and 5 show open end 27 with a flared tip 29. Thus, a focusing or de-focusing of the acoustic wave may be effected by variation of the geometry of the open end.

Figure 6:
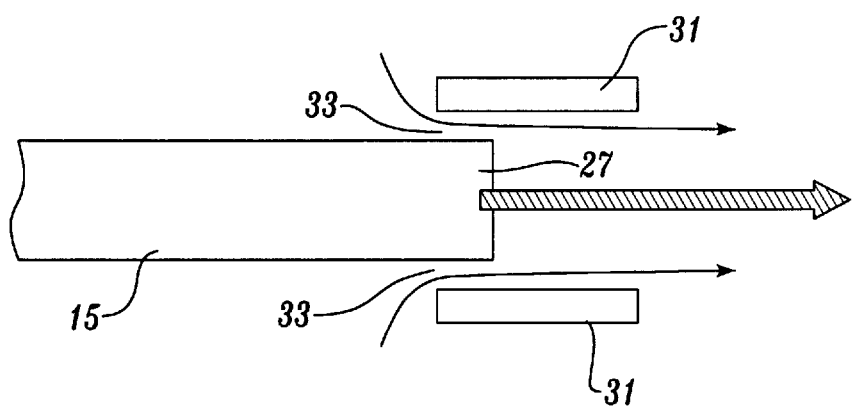
FIG. 6 is a schematic view of an air entrained nozzle embodiment of the combustion acoustic wave generator of the present invention.

Additionally, as shown in FIG. 6, air entrainment ring 31 adjacent open end 27 of combustor tube 15 creates a sheath of cold air around and flowing with the hot exhaust from the tube. After the fuel mixture combustor tube 15 detonates, the hot, high pressure combustion products rush out of open end 27 at very high speed. As these products pass through air entrainment ring 31, cool air is drawn into ring 31 through opening 33 spacing ring 31 from open end 27 through the action of viscosity and pressure differential. The cool air surrounds the hot exhaust and accelerates toward the hot exhaust velocity. In this way, air entrainment 31 operates in a similar fashion to bypass ducting on a modem turbofan engine. In addition to increasing the efficiency of the engine, bypass air lowers the off-axis noise generated by the engine.

In the same way that bypass air lowers off-axis noise emissions from a turbofan, the entrained air contains the acoustic pulses and lowers the acoustic noise off the device axis. There are several mechanisms by which this mechanism works. First, the speed of sound in the cool air is substantially lower than it is in the hot exhaust, so the, cylindrical contact boundary between the two flows acts as a pressure reflection surface. Secondly, the hot exhaust is decelerated by the process of accelerating the cool air. Overall the average flow velocity is lower, but the combined mass is substantially higher, resulting in an increase in flow momentum. This momentum may aid the propagation of the impulsive wave and increase the force exerted on a target. Thirdly, the air that is entrained into the device is taken from the region through which a pressure wave must travel to affect the operator of the device. The resulting air velocity in this region should slow down and increase the rate of decay of any pressure wave traveling toward the operator.

Figure 7:
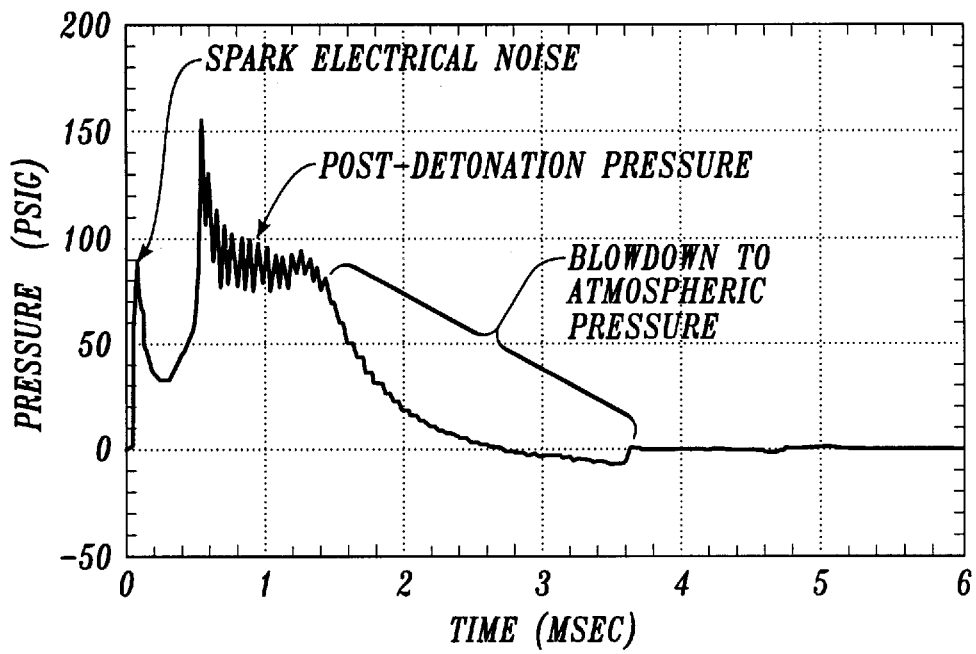
FIG. 7 is a graphical representation of exemplary sound pressure versus time data taken from the closed end of the combustor tube for a representative combustion of the pulsed combustion acoustic wave generator of the present invention.

Measurements from the pressure history at the closed end of the combustor tube give an approximate indication of the impulse which is delivered to the operator or the structure supporting the combustor tube. FIG. 7, for example, shows an example of a closed end pressure history from a 2-inch ID×36-inch-long combustor. Comparison of these data to mass and velocity data from conventional projectile weapons indicates that the present invention of the indicated size produces approximately one-third the impulse generated by an M16 rifle (based on a 55 grain projectile with a muzzle velocity of about 3,094 ft/sec).

Figure 8:
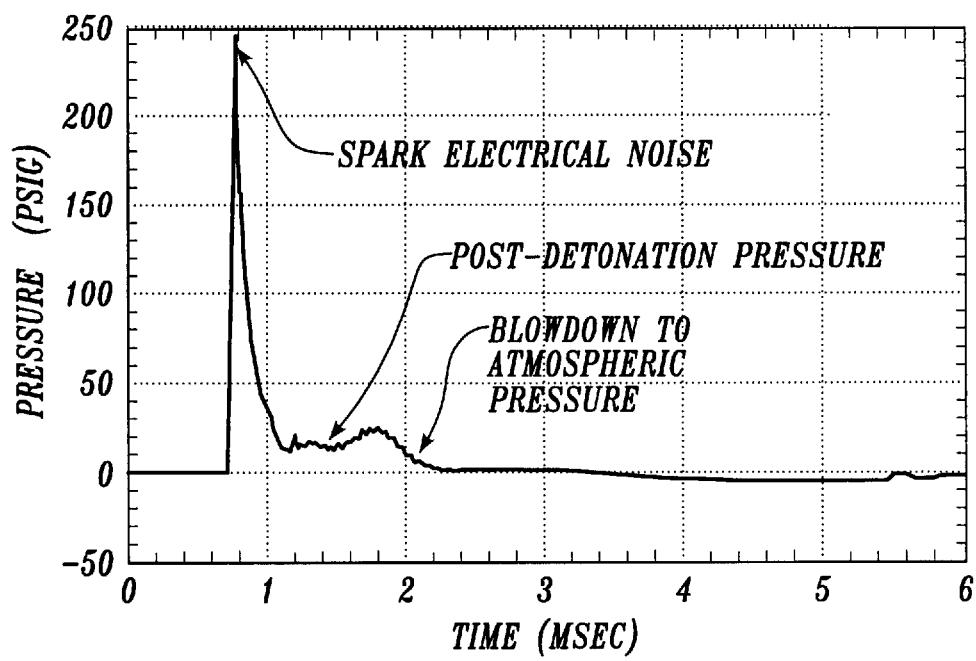
FIG. 8 is a graphical representation of exemplary sound pressure versus time data taken from the open end of the combustor tube for a representative combustion of the pulsed combustion acoustic wave generator of the present invention.

FIG. 8 shows an example pressure history at the open end of the combustor tube. These data are used to determine the impulsive waveform as the pressure wave exits the combustor. As FIG. 8 shows, the peak pressures measured are quite high—nearly 250 psig in this case. By varying the fuel used and other test parameters, the peak pressure can be changed dramatically based on the desired acoustic output.

Figure 9:
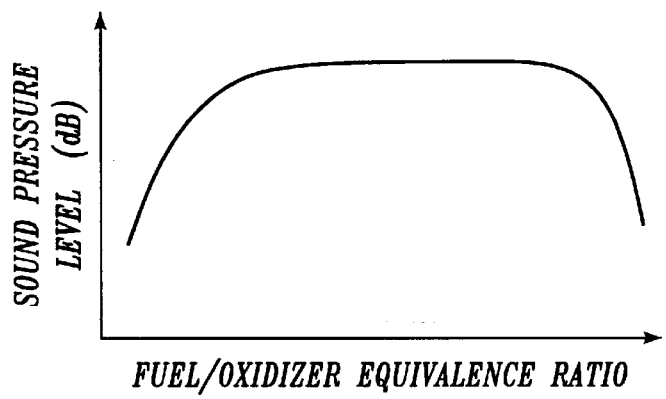
FIG. 9 is a graphical representation of exemplary sound pressure versus fuel/oxidizer equivalence ratio for combustion of representative fuels used with the pulsed combustion acoustic wave generator of the present invention.

The amplitude of the acoustic wave produced by the present invention can be tailored by variation of key operational variables such as fuel/oxidizer stoichiometry, partial filling of the combustor, and appropriate fuel/oxidizer selection. FIG. 9 illustrates the effect of changing the fuel/oxidizer stoichiometry (the ratio of fuel to oxidizer in the combustible mixture) on the peak sound pressure level at a given distance from the device. In general, the highest SPLs are obtained by use of fuel/oxidizer mixtures with a stoichiometry near unity. The SPL can be decreased by operating with a stoichiometry other than unity.

Figure 10:
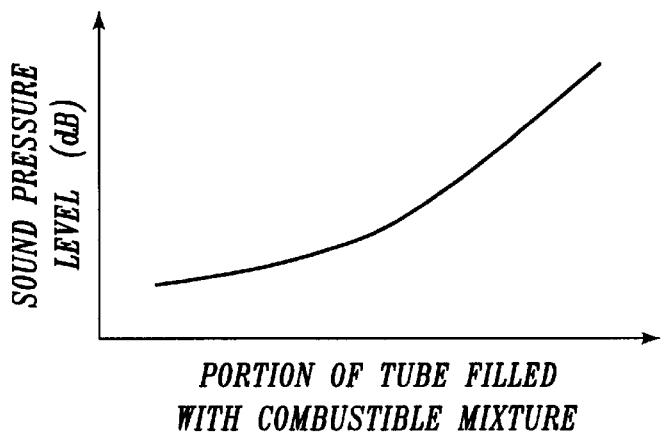
FIG. 10 is a graphical representation of exemplary sound pressure versus amount of combustible mixture for a representative combustion of the pulsed combustion acoustic wave portion of the present invention.

Another parameter which strongly impacts the peak SPL produced is the amount of combustible mixture introduced into the combustor tube. The peak SPL decreases as the percentage of the combustor tube filled with the fuel/oxidizer mixture decreases. This effect is illustrated in FIG. 10.

Figure 11:
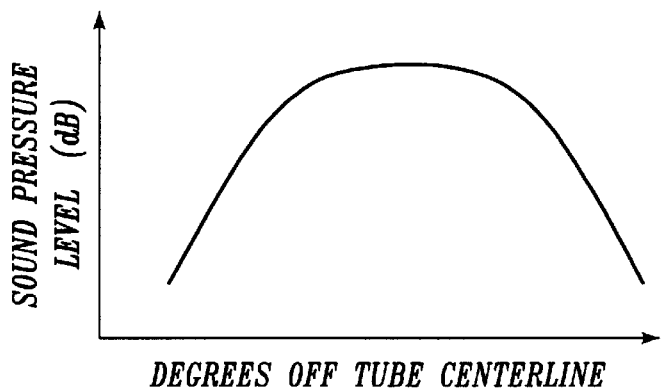
FIG. 11 is a graphical representative of exemplary sound pressure versus displacement from tube centerline for combustion of representative fuels used with the pulsed combustion acoustic wave generator of the present invention.

The present invention possesses an inherent directive nature to the acoustic pulse output. FIG. 11 illustrates the reduction of peak SPL away from the combustor tube axis.

Many types of fuels and oxidizers are usable with the pulsed combustion acoustic wave generator 1 or 13 of the present invention. The device may utilize a wide range of fuel types which include hydrogen, lower hydrocarbons (methane, ethylene, propane, ethane, butane, etc.), and higher hydrocarbons which include automotive (kerosene, diesel, etc.) and aviation fuels (Jet A, JP-1, etc.) in pure form or in a mixture (with other fuels i.e., natural gas, MAPP gas, etc.). In addition, other fuel types such as organics (i.e., nitromethane) can be utilized. Fuels can be stored in solid, liquid or compressed gas form and injected as a gas, liquid, or solid. There exists solid fuel sources which upon decomposition in an oxidizer-poor environment produce a fuel rich effluent which can be injected into the combustor along with the selected oxidizer. Other solid fuels sources could include fine metal or organic powders. Liquid fuels can be injected directly as a liquid (kerosene, Jet-A, etc.) or can be vaporized (atmospheric propane or heated liquid hydrocarbon). Gaseous fuels can be stored via compressed gas cylinders and offer the advantage of a pre-pressurized fueling system.

Practical oxidizers include air and oxygen. Fuel/oxygen mixtures generally result in higher energy densities and require significantly lower ignition energies relative to fuel/air mixtures. In general, for a given fuel, a fuel/oxygen mixture will enable the use of a smaller combustor diameter than a fuel/air mixture due to the physics of detonative wave propagation. Air and oxygen can be stored in compressed form or, in the case of air, can be inducted directly from the atmosphere. Oxygen and air could be stored in liquid form. Solid storage of oxygen can be achieved by use of commercially available gas generators which contain a grain composed of sodium chlorate or lithium perchlorate. Decomposition of this grain produces an oxygen rich effluent. The wide range of fuel/oxidizer combinations which can be used by the present invention enable a high degree of flexibility for use in different applications.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pulse acoustic wave generator for generating a series of pulsed waves of sufficient pressure to incapacitate individuals, the generator comprising:
    (a) an elongate barrel, the barrel having an inlet end and an open outlet end;
    (b) a fuel controller for metering a controlled quantity of fuel into the inlet end of the barrel;
    (c) an oxidant controller for metering a controlled quantity of oxidant into the barrel such that a fuel-oxidant mixture formed in the barrel is detonable;
    (d) an igniter extending into the barrel, the igniter controllable by an operator of the acoustic wave generator to ignite and cause detonation of a mixture of a fuel and oxidant mixture in the inlet end of the barrel to generate a pressure wave; and
    (e) a digital signal processor in electrical communication with the fuel controller and the oxidant controller, the processor programmed to control metering of fuel and oxidant through the fuel controller and the oxidant controller to produce detonable mixtures, the processor in electrical communication with the igniter to control ignition of sequential detonable fuel and oxidant mixtures;
    whereby during operation the generator produces sequentially pulsed directed pressure waves of sufficient pressure to incapacitate individuals at whom the open end of the barrel is pointed while minimizing effects on an operator of the generator out of a direct path of the pressure waves.

2. The generator of claim 1, wherein the barrel has a length sufficient to support a detonative wave.

3. The generator of claim 1, wherein the barrel is circular in cross section.

4. The generator of claim 1, wherein the outlet end of the barrel exhibits a change in cross sectional shape.

5. The generator of claim 1 further comprising an air entrainment device adjacent the outlet end of the barrel.

6. The generator of claim 1, wherein the igniter is selected from the group of igniters consisting of spark igniters, laser igniters, chemical pyrotechnic igniters, and plasma torch igniters.

7. The generator of claim 1, wherein the acoustic wave has an acoustic pressure in the range from about 50 dB to about 220 dB.

8. The generator of claim 1, wherein the fuel controller and the oxidant controller are each calibrated such that a detonable mixture of fuel and oxidant is formed in the barrel when the controllers are activated.

9. The generator of claim 1, further comprising a support base, the generator rotatably mounted on said base so that the generator is able to elevate or rotate azimuthally.

10. A method of generating directed pulsed acoustic waves of sufficient pressure for incapacitating individuals, the method comprising:
    (a) injecting a controlled quantity of fuel into a longitudinally extending barrel having an inlet end and an open outlet end;
    (b) injecting a controlled amount of an oxidant into the barrel to form a detonable mixture of fuel and oxidant;
    (c) igniting the detonable mixture of fuel and oxidant to cause a high amplitude pressure wave to propagate along the barrel and out of the open outlet end thereof; and
    (d) repeating steps (a) to (c) under control of a digital signal processor to produce a series of pulsed acoustic waves of amplitude and frequency sufficient to incapacitate an individual in front of the outlet end of the barrel in a path of the propagating wave while minimizing effects on an individual at the inlet end of the barrel, not in the direct path of the wave.

11. The method of claim 10, wherein the injecting of oxidant comprises injecting one of oxygen supplied from a compressed air source and ambient air from an ambient air driver.

12. The method of claim 10, wherein the oxidant is selected from the group consisting of oxygen, air, sodium chlorate, and lithium perchlorate.

13. The method of claim 10, wherein the propagating of an acoustic wave comprises propagating an acoustic wave having an acoustic pressure in the range from about 50 dB to about 220 dB.

14. The method of claim 10, wherein the steps of injecting fuel, injecting an oxidant, igniting a fuel oxidant mixture, and propagating an acoustic wave, are carried out in a repetitive sequence to produce a pulsed series of acoustic waves.

15. The method of claim 10, wherein the intensity of the propagated acoustic wave is controlled by altering at least one of the stoichiometry of the fuel and oxidant and the amount of fuel and oxidant.

16. The generator of claim 1, wherein the digital signal processor is programmed to control detonations to thereby produce a series of sequential combustion waves when the generator is activated by a trigger.

17. The method of claim 10 wherein the igniting causes a pressure wave to propagate at a speed of between 2,000 and 4,000 meters per second.

18. The method of claim 10 wherein the igniting causes a pressure wave of 110 to 130 dB peak level to propagate.

19. The method of claim 10 wherein the repeating includes producing a series of acoustic waves of different frequency and amplitude.

* * * * *